US012812231B2

(12) United States Patent
Park et al.

(10) Patent No.: US 12,812,231 B2
(45) **Date of Patent: *Nov. 24, 2026**

(54) CAMERA MODULE HAVING SUBSTRATE FIXING STRUCTURE

(71) Applicant: LG INNOTEK CO., LTD., Seoul (KR)

(72) Inventors: Jong Hyun Park, Seoul (KR); Min Kuk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1 day.

This patent is subject to a terminal disclaimer.

(21) Appl. No.: 18/918,882

(22) Filed: Oct. 17, 2024

(65) Prior Publication Data

US 2025/0039531 A1 Jan. 30, 2025

Related U.S. Application Data

(63) Continuation of application No. 17/755,964, filed as application No. PCT/KR2020/095143 on Nov. 11, 2020, now Pat. No. 12,149,814.

(30) Foreign Application Priority Data

Nov. 12, 2019 (KR) ........................ 10-2019-0144154

(51) Int. Cl.
*H04N 23/57* (2023.01)
*H04N 23/51* (2023.01)

(52) U.S. Cl.
CPC ............ *H04N 23/57* (2023.01); *H04N 23/51* (2023.01)

(58) Field of Classification Search
CPC ........ H04N 23/57; H04N 23/51; H04N 23/54; H04N 23/55; G03B 30/00; G03B 17/12
See application file for complete search history.

(56) References Cited

U.S. PATENT DOCUMENTS 9,187,846 B2 * 11/2015 Lee ......................... B01L 3/508
12,149,814 B2 * 11/2024 Park ....................... G03B 30/00
(Continued)

FOREIGN PATENT DOCUMENTS

CN 103428412 A 12/2013
CN 106646808 A 5/2017
(Continued)

OTHER PUBLICATIONS

Office Action dated Nov. 19, 2024 in Japanese Application No. 2022-527126.
(Continued)

*Primary Examiner* — Christopher K Peterson
(74) *Attorney, Agent, or Firm* — SALIWANCHIK, LLOYD & EISENSCHENK

(57) ABSTRACT

A camera module comprises: a first housing; a lens module arranged in the first housing; a second housing coupled to the first housing; a substrate arranged in an inner space of the first housing and the second housing; an image sensor arranged on the substrate; and an adhesive member arranged between the first housing and the second housing, wherein the second housing includes a stepped portion on which the substrate is arranged, and a protrusion portion formed on an inner surface of the second housing to be in contact with a side surface of the substrate.

20 Claims, 8 Drawing Sheets

10

(56) References Cited

U.S. PATENT DOCUMENTS

| | | | | |
|---|---|---|---|---|
| 2009/0295985 | A1* | 12/2009 | Nakamura | H04N 23/57 348/373 |
| 2012/0320544 | A1* | 12/2012 | Ohhashi | H05K 5/0052 361/752 |
| 2018/0309912 | A1 | 10/2018 | Park et al. | |
| 2019/0028620 | A1 | 1/2019 | Park | |
| 2020/0106935 | A1* | 4/2020 | Park | H04N 23/55 |
| 2020/0145560 | A1* | 5/2020 | Han | G03B 30/00 |

FOREIGN PATENT DOCUMENTS

| | | | |
|---|---|---|---|
| CN | 106803870 | A | 6/2017 |
| CN | 107735726 | A | 2/2018 |
| CN | 207150702 | U | 3/2018 |
| CN | 107976765 | A | 5/2018 |
| CN | 108463771 | A | 8/2018 |
| CN | 109644228 | A | 4/2019 |
| CN | 109792483 | A | 5/2019 |
| EP | 3 525 444 | A1 | 8/2019 |
| JP | 2009-290742 | A | 12/2009 |
| JP | 2011-215183 | A | 10/2011 |
| JP | 2013-4759 | A | 1/2013 |
| JP | 2015-68891 | A | 4/2015 |
| JP | 2017-223775 | A | 12/2017 |
| KR | 10-0862485 | B1 | 10/2008 |
| KR | 10-2010-0104269 | A | 9/2010 |
| KR | 10-2011-0045791 | A | 5/2011 |
| KR | 10-2011-0103525 | A | 9/2011 |
| KR | 10-2016-0104316 | A | 9/2016 |
| KR | 10-2019-0027078 | A | 3/2019 |
| WO | 2019/107958 | A1 | 6/2019 |

OTHER PUBLICATIONS

International Search Report dated Feb. 22, 2021 in International Application No. PCT/KR2020/095143.

Office Action dated May 7, 2023 in Chinese Application No. 202080077849.2.

Office Action dated Nov. 24, 2023 in Chinese Application No. 202080077849.2.

Supplementary European Search Report dated Dec. 13, 2023 in European Application No. 20886840.6.

Office Action dated Jan. 4, 2024 in U.S. Appl. No. 17/755,964.

Notice of Allowance dated Jul. 18, 2024 in U.S. Appl. No. 17/755,964.

Office Action dated May 20, 2025 in Korean Application No. 10-2019-0144154.

Office Action dated Jul. 7, 2026 in Japanese Application No. 2025-098575.

* cited by examiner

CAMERA MODULE HAVING SUBSTRATE FIXING STRUCTURE

CROSS-REFERENCE TO RELATED APPLICATIONS

This application is a continuation of U.S. application Ser. No. 17/755,964, filed May 12, 2022, which is the U.S. national stage application of International Patent Application No. PCT/KR2020/095143, filed Nov. 11, 2020, which claims the benefit under 35 U.S.C. § 119 of Korean Application No. 10-2019-0144154, filed Nov. 12, 2019, the disclosures of each of which are incorporated herein by reference in their entirety.

TECHNICAL FIELD

The present invention relates to a camera module.

BACKGROUND ART

The content described below provides background information on the present embodiment and does not describe the prior art.

Recently, ultra-small camera modules have been developed, and ultra-small camera modules are widely used in small electronic products such as smartphones, laptops, and game consoles.

With the popularization of automobiles, ultra-small cameras are widely used not only in small electronic products but also in vehicles. For example, a black box camera for vehicle protection or objective data of traffic accidents, a rear monitoring camera that allows the driver to monitor blind spots at the rear of the vehicle through the screen to ensure safety when the vehicle moves backward, a peripheral detection camera capable of monitoring the surroundings of the vehicle, and the like are provided.

The camera may comprise a lens, a lens holder accommodating the lens, an image sensor for converting an image of a subject collected in the lens into an electrical signal, and a printed circuit board on which the image sensor is mounted. The housing forming the outer shape of the camera has a structure in which the entire region thereof is sealed to inhibit internal components from being contaminated from foreign substances including moisture.

DETAILED DESCRIPTION OF THE INVENTION

Technical Subject

The present embodiment is intended to provide a camera module capable of enhancing the space efficiency and optimizing the assembly process.

Technical Solution

As an exemplary embodiment, a camera module comprises: a first housing; a lens module disposed in the first housing; a second housing coupled to the first housing; a substrate disposed in an inner space of the first housing and the second housing; an image sensor disposed on the substrate; and an adhesive member disposed between the first housing and the second housing, wherein the second housing includes a stepped portion on which the substrate is disposed, and a protrusion formed on an inner side surface of the second housing to contact the side surface of the substrate.

In addition, the protrusion portion may include a plurality of protrusions.

In addition, a separation space may be formed between the plurality of protrusion portions and the substrate, and the adhesive member may be disposed in the separation space.

In addition, the first housing may include a groove formed in a lower surface, and the groove may face the separation space.

In addition, the width of a lower surface of the first housing may be greater than the width of an upper surface of the second housing.

In addition, the protrusion portion may be disposed on the stepped portion.

In addition, the first housing may include a groove being formed in a lower surface, and the groove may face the protrusion portion.

In addition, a lower surface of the first housing includes a first surface disposed on an outer side of the groove and a second surface disposed on an inner side, wherein the first surface and the second surface may be disposed on the same plane.

In addition, the adhesive member may be disposed between a first surface of the first housing, a second surface, a groove in the first housing, an upper surface of the second housing, a protrusion portion of the second housing, and a stepped portion of the second housing.

In addition, the width of the first surface of the first housing may be greater than the width of an upper surface of the second housing.

A camera module according to an aspect of the present invention for achieving the above objects comprises: a first housing; a lens module being disposed in the first housing; a second housing being coupled to the first housing; a substrate being disposed in an inner space of the first housing and the second housing; and an image sensor disposed on the substrate; and an adhesive member disposed between the first housing and the second housing, wherein the adhesive member is disposed between an inner surface of the second housing and a side surface of the substrate.

Advantageous Effects

According to the present invention, a camera module capable of improving space efficiency and optimizing an assembly process can be provided.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

An 'optical axis direction' used hereinafter is defined as an optical axis direction of a lens coupled to the lens driving device. Meanwhile, the 'optical axis direction' may correspond to an 'up and down direction', a 'z-axis direction', and the like.

Hereinafter, the present invention will be described in more detail with reference to the accompanying drawings.

Figure 1:
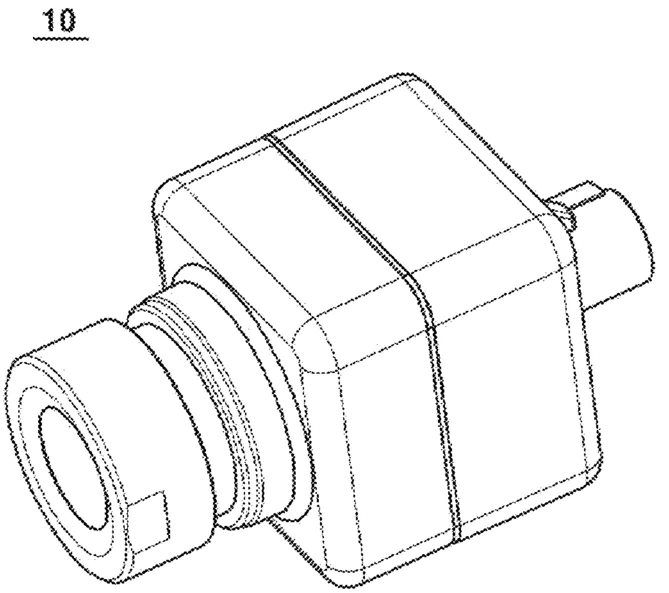
FIGS. 1 and 2 are perspective views of a camera module according to an embodiment of the present invention.
Figure 2:
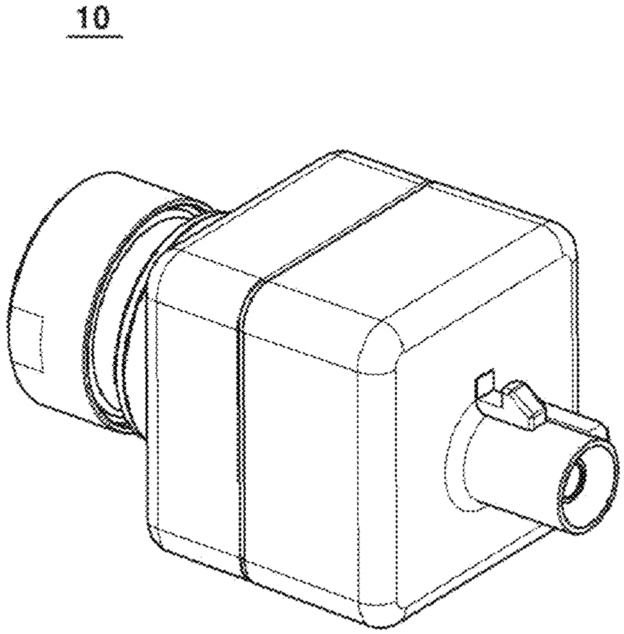
Figure 3:
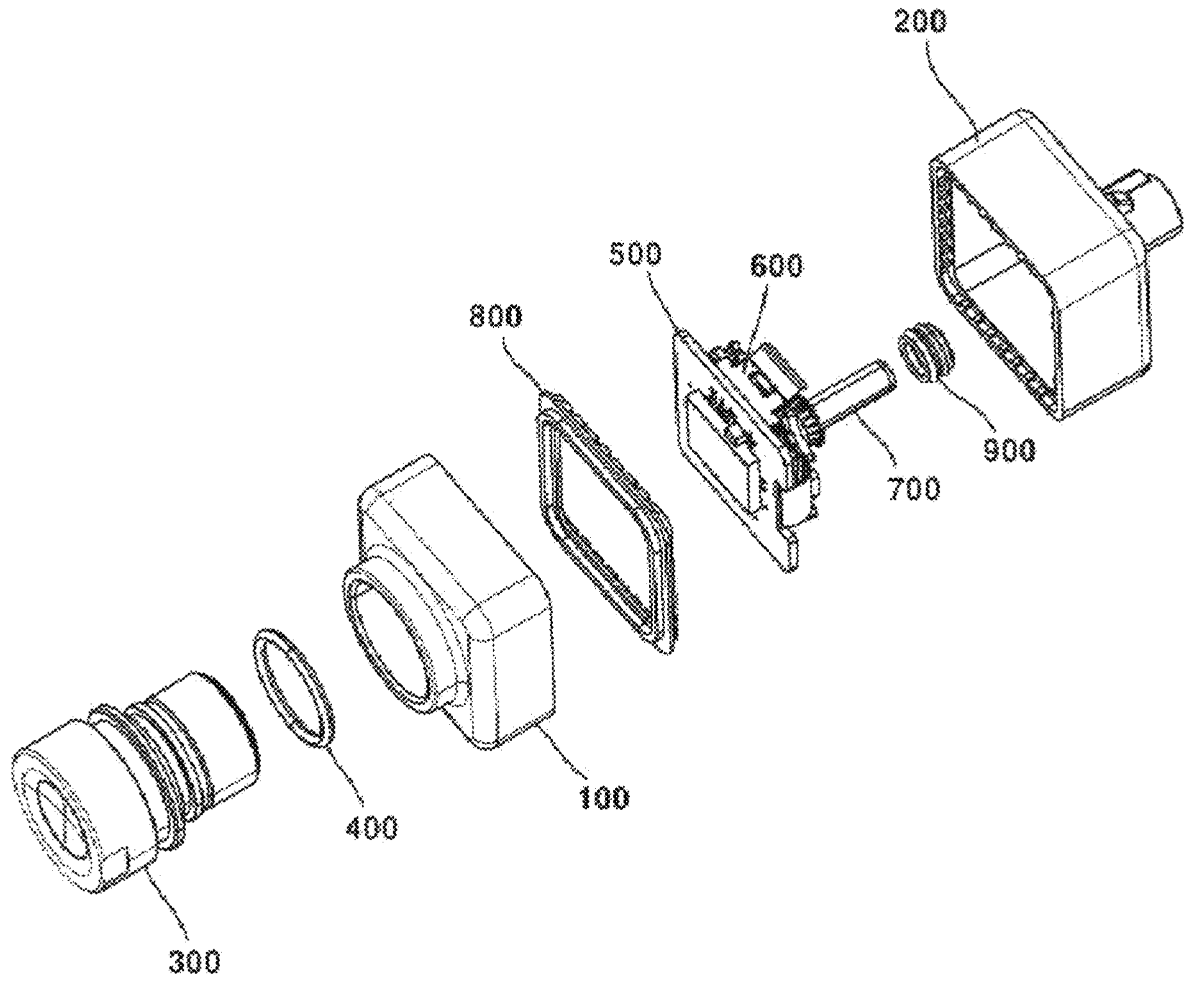
FIG. 3 is an exploded perspective view of a camera module according to an embodiment of the present invention.
Figure 4:
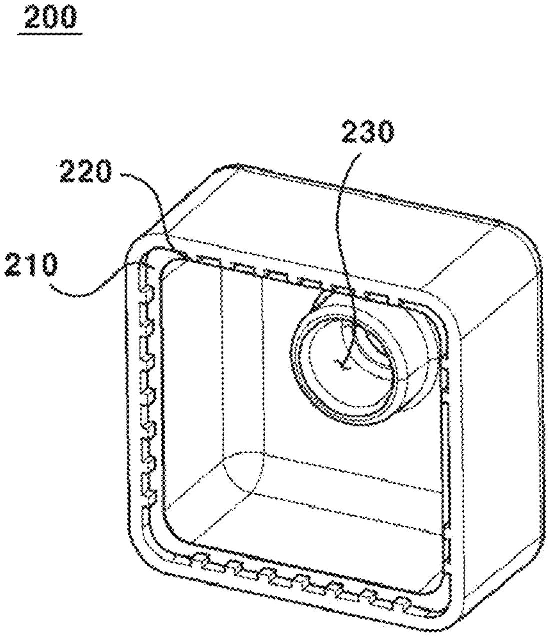
FIGS. 4 and 5 are perspective views of a partial configuration of a camera module according to an embodiment of the present invention.
Figure 5:
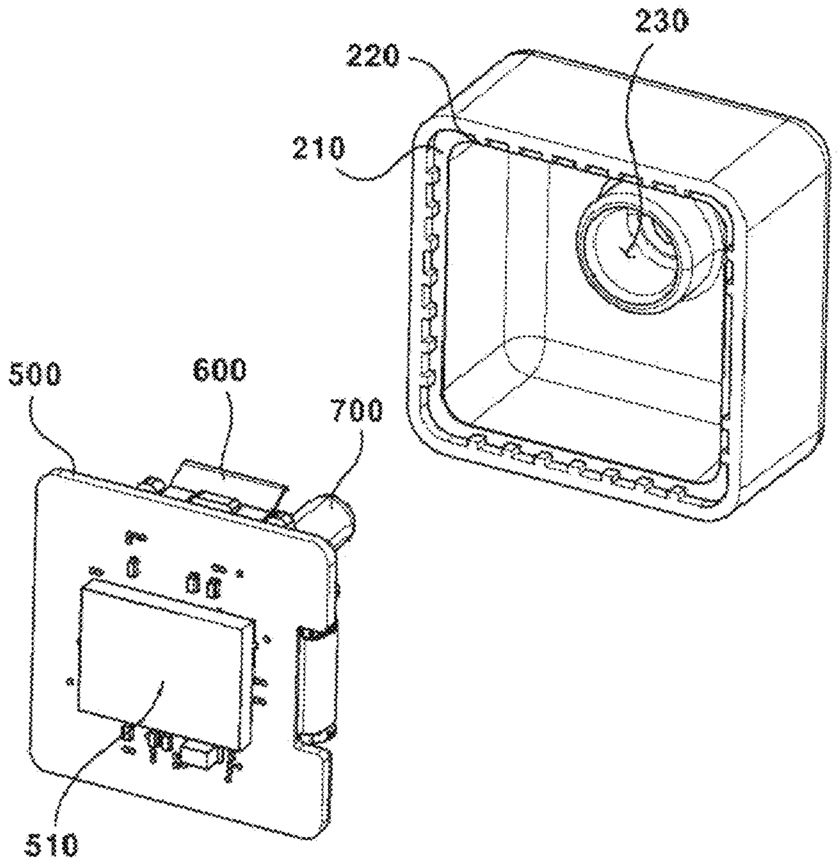
Figure 6:
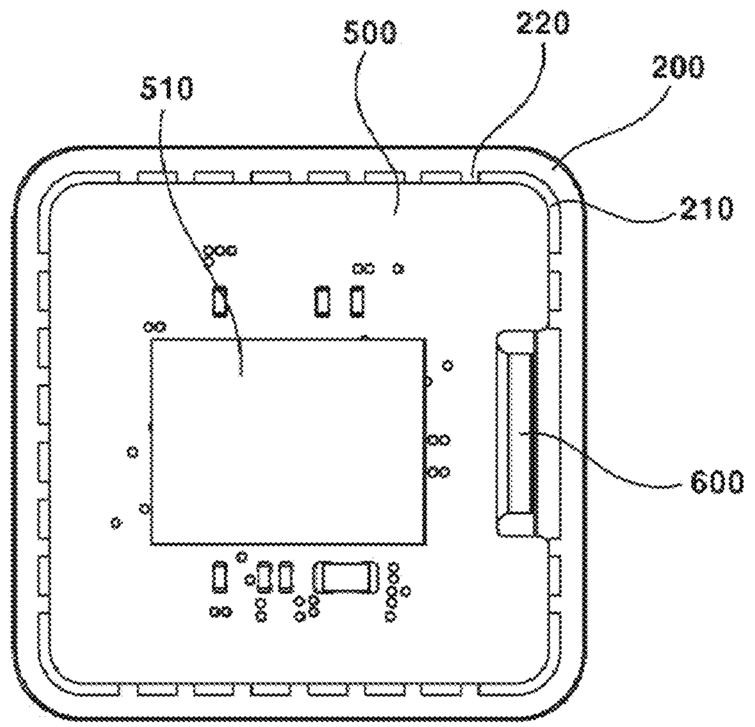
FIG. 6 is a plan view of a camera module according to an embodiment of the present invention.
Figure 7:
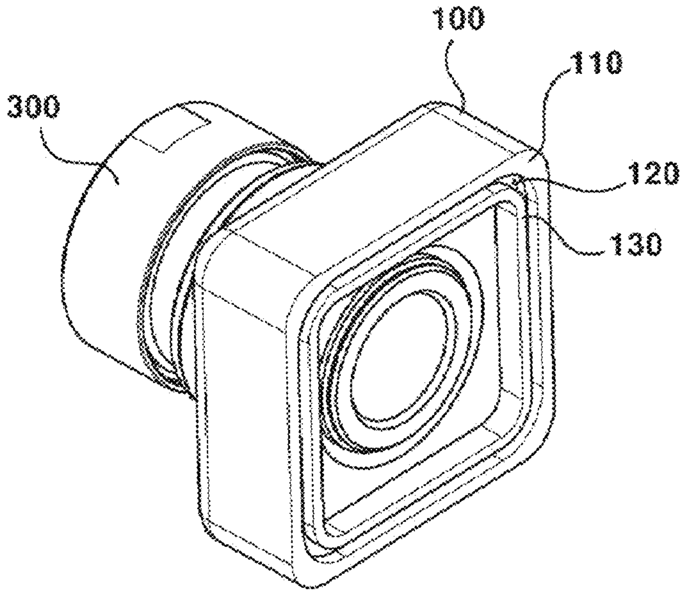
FIG. 7 is a perspective view of a partial configuration of a camera module according to an embodiment of the present invention.
Figure 8:
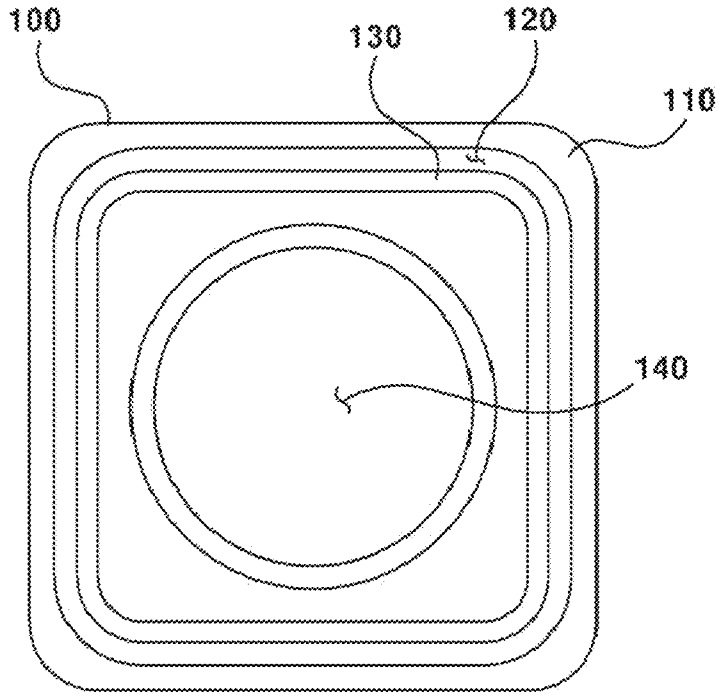
FIG. 8 is a bottom view of a partial configuration of a camera module according to an embodiment of the present invention.
Figure 9:
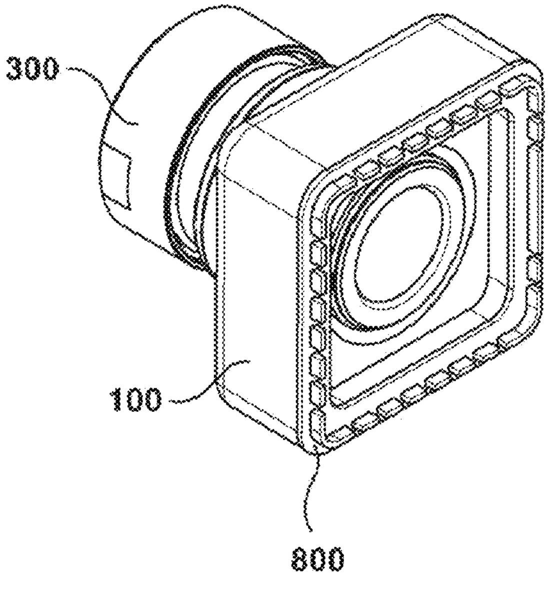
FIG. 9 is a perspective view of a partial configuration of a camera module according to an embodiment of the present invention.
Figure 10:
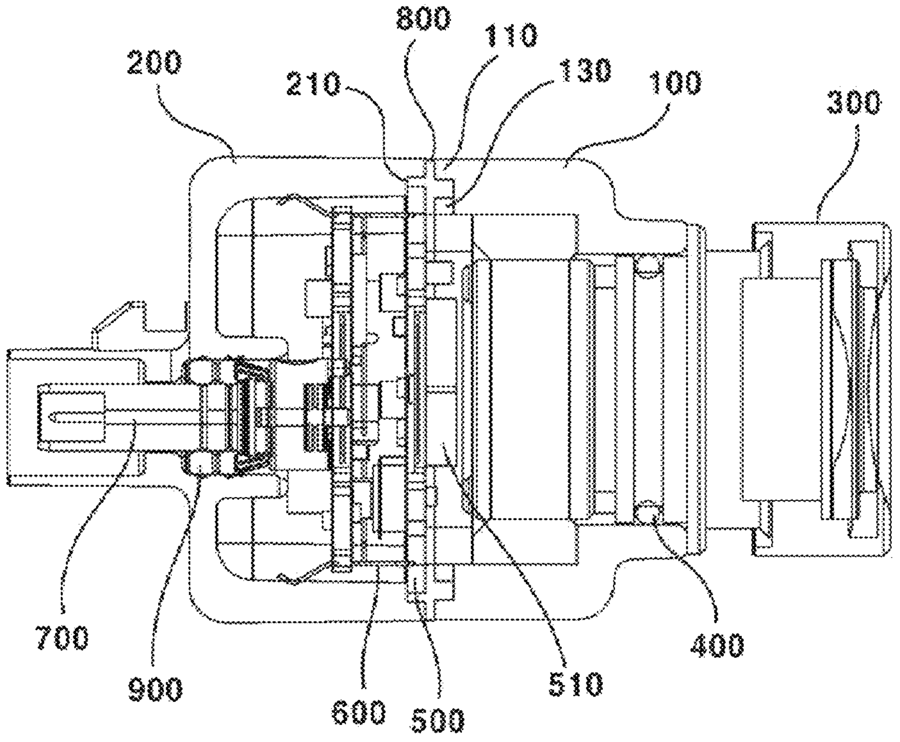
FIG. 10 is a cross-sectional view of a camera module according to an embodiment of the present invention.
Figure 11:
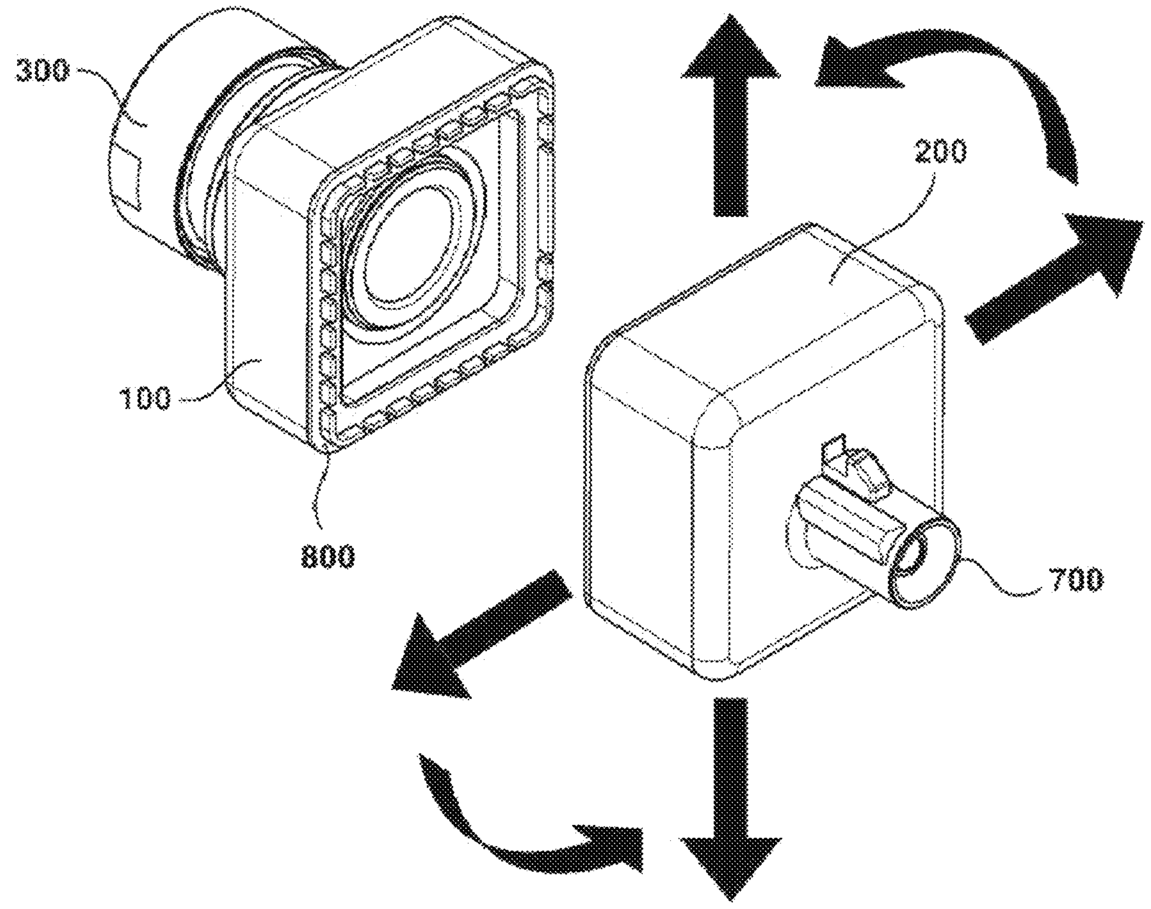
FIG. 11 is a perspective view illustrating an assembly process of a camera module according to an embodiment of the present invention.

FIGS. 1 and 2 are perspective views of a camera module according to an embodiment of the present invention. FIG. 3 is an exploded perspective view of a camera module according to an embodiment of the present invention. FIGS. 4 and 5 are perspective views of a partial configuration of a camera module according to an embodiment of the present invention. FIG. 6 is a plan view of a camera module according to an embodiment of the present invention. FIG. 7 is a perspective view of a partial configuration of a camera module according to an embodiment of the present invention. FIG. 8 is a bottom view of a partial configuration of a camera module according to an embodiment of the present invention. FIG. 9 is a perspective view of a partial configuration of a camera module according to an embodiment of the present invention. FIG. 10 is a cross-sectional view of a camera module according to an embodiment of the present invention. FIG. 11 is a perspective view illustrating an assembly process of a camera module according to an embodiment of the present invention.

Referring to FIGS. 1 to 11, a camera module 10 according to an embodiment of the present invention may comprise a first housing 100, a second housing 200, a lens module 300, and a first clastic member 400, a substrate 500, an image sensor 510, a shield can 600, a cable 700, an adhesive member 800, and a second elastic member 900, but it may be implemented except for some of these configurations, and additional configurations are not excluded.

The camera module 10 may include a first housing 100. The first housing 100 may form the outer appearance of the camera module 10. The first housing 100 may be coupled to the second housing 200. The first housing 100 may be disposed on one side of the second housing 200. The first housing 100 may be formed in a hexahedron shape with an open lower portion. The first housing 100 may be coupled to the second housing 200 by an adhesive member 800. The lens module 300 and the first elastic member 400 may be disposed in the first housing 100. The width of the lower surfaces 110 and 130 of the first housing 200 may be greater than the width of an upper surface of the second housing 200.

A groove 120 may be formed in the first housing 200. The groove 120 may be formed in the lower surfaces 110 and 130 of the first housing 200. The groove 120 may be formed to be concave upwardly in the lower surfaces 110 and 130 of the first housing 200. The groove 120 may face the separation space being formed between a side surface of the substrate 500 and the protrusion portion 220 or the plurality of protrusions of the second housing 200. The groove 120 may face the protrusion portion 220. An adhesive member 800 may be interposed in the groove 120.

The lower surfaces 110 and 130 of the first housing 200 may include a first surface 110 disposed on an outer side of the groove 120 and a second surface 130 disposed on an inner side of the groove 120. The first surface 110 and the second surface 130 may be disposed on the same plane. An adhesive member 800 may be placed on the first surface 110 and the second surface 130. The width of the first surface 110 may be greater than the width of the upper surface of the second housing 200.

The camera module 10 may include a second housing 200. The second housing 200 may form the outer appearance of the camera module 10. The second housing 200 may be coupled to the first housing 100. The second housing 200 may be disposed on the other side of the first housing 100. The second housing 200 may be formed in a hexahedral shape with an open top. The second housing 200 may be coupled to the first housing 100 by the adhesive member 800. A substrate 500, an image sensor 510, a shield can 600, a cable 700, and a second clastic member 900 may be disposed in the second housing 200.

The second housing 200 may include a stepped portion 210. The stepped portion 210 may be formed to be concave downward from the upper surface of the second housing 200. The stepped portion 210 may be formed to be concave from the inner side surface of the second housing 200 toward the outer side. The stepped portion 210 may face a lower surface of the first housing 100. The stepped portion 210 may be disposed on the substrate 500. In one embodiment of the present invention, the inner side surface of the second housing 200 means an inner side surface of the second housing 200 formed on the stepped portion 210, but it does not mean an inner side surface of the second housing 200 formed below the stepped portion 210.

The second housing 200 may include a protrusion portion 220. The protrusion portion 220 may be formed in the stepped portion 210. Specifically, the protrusion portion 220 may be formed to be protruded upward from the stepped portion 210. The protrusion portion 220 may be formed on an inner side surface of the second housing 200. Specifically, the protrusion portion 220 may be formed to be protruded from an inner side surface of the second housing 200 toward the inner side. The protrusion portion 220 may be in contact with a side surface of the substrate 500. Through this, the protrusion portion 220 may guide the position of the substrate 500 being disposed on the stepped portion 210 of the second housing 200. Referring to FIG. 5, the protrusion portion 220 may be spaced apart from the inner side surface of the second housing. Through this, a space in which the substrate 500 can be seated on the stepped portion 210 may be formed. Unlike this, the protrusion portion 220 may be spaced apart from the inner side surface of the second housing 200. That is, a region in which the stepped portion 210 is exposed upward may be increased. Through this, the region in which the adhesive member 800 is interposed may be widened.

The protrusion portion 220 may include a plurality of protrusions. The plurality of protrusions may be spaced apart from one another. A separation space may be formed between the plurality of protrusions and the substrate 500. A separation space may be formed between the plurality of protrusions and the side surface of the substrate 500. The adhesive member 800 may be interposed in a separation space formed between the plurality of protrusions and the side surface of the substrate 500.

The second housing 200 may include a hole 230. The hole 230 may be formed in a lower plate of the second housing 200. The hole 230 may be penetrated by the cable 700. The second clastic member 700 may be disposed in a space between the hole 230 and the cable 700.

The camera module 10 may include a lens module 300. The lens module 300 may be disposed in the first housing 100. The lens module 300 may be disposed in the opening 140 of the first housing 100. The lens module 300 may be coupled to the first housing 100. The lens module 300 may be screw-coupled to the first housing 100. A portion of the lens module 300 may be exposed toward an upper side of the first housing 100. A first elastic member 400 may be disposed between the lens module 300 and the first housing 100. The lens module 300 may include at least one lens. The lens module 300 may face the image sensor 510.

The camera module 10 may include a first elastic member 400. The first elastic member 400 may be disposed between the lens module 300 and the first housing 100. The first clastic member 400 may be formed of a material having elasticity. The first elastic member 400 may be formed in a circular band shape. The first elastic member 400 may be referred to as an O-ring. The first clastic member 400 may seal the inside of the camera module 10 by removing a separation space being disposed between the lens module 300 and the first housing 100.

The camera module 10 may include a substrate 500. The substrate 500 may be disposed in an inner space of the first housing 100 and the second housing 200. The substrate 500 may be disposed in the second housing 200. The substrate 500 may be disposed on the stepped portion 210. The substrate 500 may be in contact with the protrusion portion 220. A side surface of the substrate 500 may be in contact with the protrusion portion 220. A separation space may be formed between the substrate 500 and the plurality of protrusions. The adhesive member 800 may be interposed in the separation space formed between the substrate 500 and the plurality of protrusions. The substrate 500 may be electrically connected to the image sensor 510. The substrate 500 may be electrically connected to the cable 700. A shield can 600 may be disposed on the substrate 500. The substrate 500 may include a plurality of substrates. The plurality of substrates may be formed to be spaced apart from each other in the vertical direction. A shield can 600 may be disposed between the plurality of substrates.

The camera module 10 may include an image sensor 510. The image sensor 510 may be disposed on the substrate 500. The image sensor 510 may be disposed on an upper surface of the substrate 500. The substrate 500 may be electrically connected to the substrate 500. The image sensor 510 may face the lens module 300. The image sensor 500 may form an image through light passing through the lens module 300.

The camera module 10 may include a shield can 600. The shield can 600 may be disposed on the substrate 500. The shield can 600 may be disposed between a plurality of substrates. The shield can 600 may be formed of metal. The shield can 600 may be used for conducting electricity or grounding the substrate 500.

The camera module 10 may include a cable 700. The cable 700 may be disposed in the second housing 200. The cable 700 may be penetrating through the hole 230 of the second housing 200. The cable 700 may be coupled to the substrate 500. The cable 700 may be coupled to a lower surface of the substrate 500. The cable 700 may be electrically connected to the substrate 500. The cable 700 may supply an external power to the substrate 500. A second elastic member 900 may be disposed between the cable 700 and the hole 230 of the second housing 200.

The camera module 10 may include an adhesive member 800. The adhesive member 800 may be interposed between the first housing 100 and the second housing 200. The adhesive member 800 may be disposed between the first surface 110 of the first housing 100, the second surface 130, the groove 120, the upper surface of the second housing 200, the protrusion portion 220 of the second housing 200, and the stepped portion 210 of the second housing 200. The adhesive member 800 may be disposed in a separation space being formed between the plurality of protrusions of the second housing 200 and the side surface of the substrate 500. Through this, the adhesive member 800 may fix the substrate 500 to the second housing 200.

The adhesive member 800 may include an adhesive such as epoxy. Referring to FIG. 11, the adhesive member 800 is disposed between the first housing 100 and the second housing 200, and it may be cured after the optical axis alignment process of the lens module 300 and the image sensor 510. Through this, the product assembly process can be reduced.

The camera module 10 may include a second elastic member 900. The second elastic member 900 may be disposed between the cable 700 and the second housing 200. Specifically, the second elastic member 900 may be disposed between the cable 700 and the hole 230 of the second housing 200. The second elastic member 900 may be formed in a circular band shape. The second elastic member 900 may be referred to as a cable seal. The second elastic member 900 may seal the inside of the camera module 10 by removing a separation space formed between the second housing 200 and the cable 700.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera module comprising:

a first housing;

a lens module disposed in the first housing;

a second housing coupled to the first housing;

a substrate disposed between the first housing and the second housing; and an adhesive member disposed between the first housing and the second housing, wherein the second housing includes a protrusion portion protruding from an inner surface thereof, wherein an adhesive accommodating space is defined between the protrusion portion and a side surface of the substrate, wherein the first housing includes a groove formed in a lower surface thereof, and wherein the groove is in communication with the adhesive accommodating space to define a continuous adhesive receiving region extending along the groove and the adhesive accommodating space.

2. The camera module according to claim 1, wherein the second housing includes a stepped portion on which the substrate is disposed, and wherein the protrusion portion is in contact with a side surface of the substrate.

3. The camera module according to claim 2, wherein the protrusion portion is disposed on the stepped portion.

4. The camera module according to claim 2, wherein the stepped portion is formed to be concave downward from an upper surface of the second housing coupled to the first housing.

5. The camera module according to claim 1, wherein the protrusion portion includes a plurality of protrusions.

6. The camera module according to claim 5, wherein a separation space is formed between the plurality of protrusions and the substrate, and wherein the adhesive member is disposed in the separation space.

7. The camera module according to claim 6, wherein the groove faces the separation space.

8. The camera module according to claim 1, wherein a width of the lower surface of the first housing is greater than a width of an upper surface of the second housing.

9. The camera module according to claim 1, wherein the groove faces the protrusion portion.

10. The camera module according to claim 9, wherein the lower surface of the first housing includes a first surface disposed on an outer side of the groove and a second surface disposed on an inner side of the groove, and wherein the first surface and the second surface are disposed on a same plane.

11. The camera module according to claim 10, wherein the adhesive member is disposed among the first surface of the first housing, the second surface of the first housing, the groove in the first housing, an upper surface of the second housing, the protrusion portion of the second housing, and a stepped portion of the second housing.

12. The camera module according to claim 10, wherein a width of the first surface is greater than a width of an upper surface of the second housing.

13. The camera module according to claim 1, comprising a first elastic member disposed between the lens module and the first housing.

14. The camera module according to claim 1, comprising a second elastic member, wherein the second housing includes a hole through which a cable passes, and wherein the second elastic member is disposed between the hole and the cable.

15. The camera module according to claim 1, wherein the substrate is provided in plurality, and the plurality of substrates are spaced apart from each other in a vertical direction.

16. A camera module comprising:

a first housing;

a lens module disposed in the first housing;

a second housing coupled to the first housing;

a substrate disposed in an inner space between the first housing and the second housing;

an image sensor disposed on the substrate; and an adhesive member disposed between the first housing and the second housing, wherein an adhesive accommodating space is defined between an inner surface of the second housing and a side surface of the substrate, wherein the first housing includes a groove formed in a lower surface thereof, and wherein the groove is in communication with the adhesive accommodating space to define a continuous adhesive receiving region extending along the groove and the adhesive accommodating space.

17. The camera module according to claim 16, wherein a protrusion is formed on the inner surface of the second housing to contact the side surface of the substrate.

18. The camera module according to claim 17, wherein a separation space is formed between the protrusion and the substrate, and wherein the adhesive member is disposed in the separation space.

19. The camera module according to claim 18, wherein the groove faces the separation space.

20. The camera module according to claim 19, wherein the lower surface of the first housing includes a first surface disposed outside the groove and a second surface disposed inside the groove, and wherein the adhesive member is disposed on the first surface of the first housing, the second surface of the first housing, the groove of the first housing, and an upper surface of the second housing.

* * * * *